United States Patent Office 3,153,077
Patented Oct. 13, 1964

3,153,077
PROCESS FOR PREPARING ORGANIC
BIS-THIOSULFATES
Giuliana C. Tesoro, Dobbs Ferry, N.Y., assignor to J. P.
Stevens & Co., Inc., New York, N.Y., a corporation of
Delaware
No Drawing. Filed Mar. 8, 1960, Ser. No. 13,429
5 Claims. (Cl. 260—453)

This invention relates to a new and improved process for manufacturing organic sulfones. More specifically this invention is concerned with the manufacture of organic bis(alkali metal thiosulfate) sulfones corresponding to the following formula:

(1) 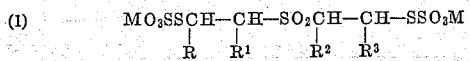

where $R$, $R^1$, $R^2$, and $R^3$ can be hydrogen or a lower alkyl radical having from 1 to 4 carbon atoms, and $M$ is an alkali metal.

These compounds are characterized by their ability to dissociate in the presence of an alkali, yielding reactive substances which are excellent crosslinking agents for natural and synthetic macromolecular compounds containing active hydrogen (e.g. cellulose, proteins, polyvinyl alcohol and the like).

It is generally known that organic thiosulfates may be prepared by the reaction of organic halide with alkali thiosulfate according to the following general equation:

(I) $RX + M_2SSO_3 \rightarrow RSSO_3M + MX$ where $R$ is an alkyl or aralkyl, $X$ is halogen, and $M$ has the same meaning as above. The bis-thiosulfate compounds of Formula 1 can be prepared by an analogous method by reacting a bis($\beta$-haloalkyl) sulfone with an alkali metal thiosulfate. By way of specific example, the foregoing reaction is illustrated by employing bis(beta-chloroethyl) sulfone and sodium thiosulfate according to the following equation:

(II) $ClCH_2CH_2SO_2CH_2CH_2Cl + 2Na_2SSO_3 \rightarrow$
$2NaCl + NaO_3SSCH_2CH_2SO_2CH_2CH_2SSO_3Na$ However, this process is not suitable for large scale manufacture of the compound for the following reasons:

(a) Bis(beta chloroethyl) sulfone is not commercially available.

(b) Bis(beta chloroethyl) sulfone is a water insoluble solid and forms a two-phase mixture with the aqueous thiosulfate solution. The heterogeneous nature of the mixture decreases the rate at which the desired reaction takes place.

(c) Bis(beta chloroethyl) sulfone is a very difficult compound to handle, due to its extreme vesicant action and toxicity.

(d) The separation of the desired product from the sodium chloride formed as a by-product is difficult due to the small difference in solubility between the compounds.

Some of these difficulties can be overcome by preparing the bisthiosulfate of Formula 1 from divinyl sulfone. This reaction may be represented by the following equation:

(III)
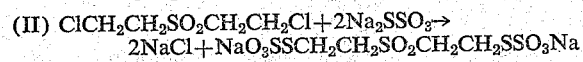

The reaction is discussed in J. Org. Chem. 11, 719–735 (1946), and the preparation of the bis-thiosulfate (referred to as "Bunte salt") is disclosed (p. 732 l.c.). The preparation by the method described requires 20 hours. The yield reported is 44% of the theoretical. While this method overcomes some of the difficulties outlined for the synthesis discussed earlier, it is apparent that a reaction time of 20 hours, and a yield of 44% are not desirable for a practical manufacturing process.

Accordingly it is an object of the present invention to provide a process by which the bis thiosulfates of Formula 1 can be prepared on a large scale and in substantially quantitative yields. It is a further object of the invention to provide a process by which the compounds can be prepared rapidly, the reaction time being approximately 3 to 4 hours. It is a further object of the invention to provide a process by which the compounds can be obtained in substantialy pure form without the use of elaborate extraction or recrystallization procedures. Further objects of the invention will be apparent from the description which follows.

The novel process of this invention comprises adding a bis($\alpha$ unsaturated hydrocarbon) sulfone and an organic acid having a dissociation constant of about $10^{-5}$ (e.g. acetic) to a concentrated aqueous solution of the inorganic thiosulfate at such a rate that the pH of the reaction mixture is maintained between 6.0 and 9.0, and preferably between 7.0 and 8.0 at all times. The reaction which takes place may be represented by the following equation using sodium thiosulfate, acetic acid and divinyl sulfone in aqueous solution:

(IV) $CH_2=CHSO_2CH=CH_2 + 2Na_2SSO_3 + 2CH_3COOH$
$\rightarrow 2CH_3COONa + NaO_3SSCH_2CH_2SO_2CH_2CH_2SSO_3Na$ The acetic acid neutralizes the sodium hydroxide which is formed in the reaction between sodium thiosulfate and divinyl sulfone (see Equation III), and prevents the reverse reaction from taking place. The pH can be maintained within the optimum range and the desired reaction proceeds rapidly and completely even at room temperature.

The reaction temperature may vary between 10° C. and 80° C., and temperatures of 20° C. to 40° C. are preferred. The amount of water present during the reaction should be sufficient to maintain the homogeneous nature of the reaction mixture. Amounts of water varying from 40% to 80% of the total charge have been successfully employed, and amounts of 60 to 70% are preferred. The reaction proceeds completely, and yields of 90% to 100% of the theoretical are obtained. The purification of the product can be easily carried out by concentrating the aqueous solution under reduced pressure, cooling and filtering. The sodium acetate present can be easily removed in this manner, due to its high solubility in water. The following examples are illustrative only and should not be construed as limiting the invention.

Example I 285 g. of anhydrous potassium thiosulfate (1.5 mol) are dissolved in 650 g. of water, in a reaction vessel equipped with mechanical stirrer, thermometer, two addition funnels and a pair of electrodes leading to a pH meter. The addition of divinyl sulfone (88.5 g.–0.75 mol) is begun very slowly, and the pH begins to rise immediately. As soon as the pH of the solution rises, addition of glacial acetic acid is begun and controlled so as to maintain the pH of the reaction mixture between 6.0 and 9.0 at all times. The total time required for the addition of the divinyl sulfone is about 2 hours, and 81 g. of acetic acid are consumed during this time (90% of the calculated amount). A titration of free thiosulfate with standard iodine at this point shows that 90% of the thiosulfate present has reacted. During this initial rapid phase of the reaction, the temperature may rise slightly above room temperature (to 35–40° C.) After the addition of divinyl sulfone is completed, the reaction continues more slowly and slow addition of acetic acid is required for about 2 hours longer in order to maintain the pH of the reaction mixture at the desired level (7.0 to 8.0). At the end of this period, the pH is brought to 7.0 with acetic acid. The pH remains constant when the reaction is complete. The total amount of acetic acid consumed is 89 g. (about 99% of the calculated amount) and an iodine titration shows that 98% of the thiosulfate present has reacted. On cooling slightly below room temperature, the bis-thiosulfate precipitates as a white crystalline solid which can be easily isolated in pure form by filtration and low temperature drying.

*Example II*

894 pounds of sodium thiosulfate pentahydrate are dissolved in 1009 lbs. of water in a stainless steel reactor equipped with mechanical agitator, thermometer and two addition lines regulated by control valves. The reactor is also equipped with coils through which cooling water or steam may be circulated. A circulating pump is connected for continuous sampling of the reaction mixture through a small vessel in which the electrodes of a pH meter are immersed. The dissolution of sodium thiosulfate in water is accompanied by heat absorption, and it is advisable to apply some heat in order to maintain a temperature of 20 to 30° C. After all the sodium thiosulfate is dissolved, the addition of divinyl sulfone (212 pounds) is cautiously begun. When the first rise in pH is observed, addition of 56% acetic acid is immediately begun. The simultaneous addition of the divinyl sulfone and acetic acid is continued at a controlled rate, so that the pH of the reaction mixture is maintained between 7.0 and 9.0 at all times. At the end of two hours, all of the sulfone has been added. The temperature has increased from 22° C. to 34° C. A titration with standard iodine shows that 90% of the thiosulfate has reacted. 330 lbs. of 56% acetic acid (89% of the calculated amount) have been consumed. Addition of acid is continued at such a rate as to keep the pH at 7.0-8.0, and over a period of two additional hours, the unreacted thiosulfate drops to 4% of the initial value (96% reaction) and the acetic acid consumed increases to 374 lbs. (97% of the calculated amount). At the end of this time, the pH of the reaction mixture is 7.0 and remains constant without further addition of acid. The reaction mixture is a clear, pale yellow solution at 30° C. The composition of the product thus obtained is approximately 11.0% sodium acetate
28% product ($NaO_3SSCH_2CH_2SO_2CH_2CH_2SSO_3Na$)
60% water
1% free sodium thiosulfate and by-products The weight of solution obtained is 2500 pounds. If desired, the product may be isolated in pure form by chilling this solution and filtering. For example, when 1000 grams of the solution are cooled to 10° C. and filtered, 175 grams of white crystalline product are obtained after drying (63% of the amount present). By concentrating and cooling the filtrate, an additional 70 grams of product are obtained (total purified yield 87% of the calculated amount).

*Example III*

The procedure of Example I is repeated except that 372.0 g. (1.5 mol) of sodium thiosulfate pentahydrate and 109.5 g (0.75 mol) of di-isopropenyl sulfone are employed and the compound

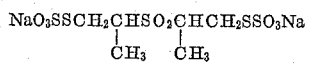
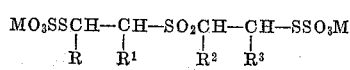

is obtained in good yield.

Although the invention disclosed herein is broadly applicable to compounds of the general formula

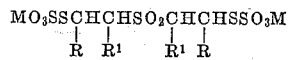

the preferred group has particular reference to the symmetrical sulfones corresponding to the following formula

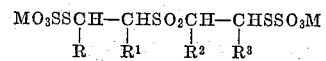

where M, R, and $R^1$ have the same meaning as in Formula 1 above.

Alkali metals contemplated by this invention include lithium, potassium, cesium, rubidium, and sodium, of which the last mentioned will be found to be most practicable in the present process.

It will be apparent to one skilled in the art that various modifications may be made in the novel process disclosed herein. Although acetic acid is the preferred organic acid because of practical considerations, it will be evident that various organic acids which have an ionization constant of about $10^{-5}$ may be employed. Representative of organic acids which can be utilized are

| Acid: | K |
|---|---|
| Acetic | $1.753 \times 10^{-5}$ |
| Benzoic | $6.3 \times 10^{-5}$ |
| Butyric | $1.48 \times 10^{-5}$ |
| Crotonic | $2.0 \times 10^{-5}$ |
| Hexahydrobenzoic | $1.26 \times 10^{-5}$ |
| Propionic | $1.4 \times 10^{-5}$ |

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What I claim is:

1. A process for the preparation of alkali metal salts of organic bis-thiosulfates corresponding to the formula:

$$MO_3SSCH-CHSO_2CH-CHSSO_3M$$
$$\phantom{MO_3SS}R\phantom{CH}R^1\phantom{CHSO_2}R^2\phantom{CH}R^3$$

wherein M is an alkali metal selected from the group consisting of sodium and potassium; and R, $R^1$, $R^2$, and $R^3$ are each members selected from the group consisting of hydrogen and lower alkyl groups having 1 to 4 carbon atoms, comprising reacting in substantially stoichiometric proportions at temperatures ranging between 10° C. and 80° C. a sulfone of the structure:

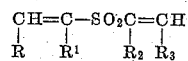

wherein R, $R^1$, $R^2$, and $R^3$ have the same meaning as above with an alkali metal thiosulfate of the structure $M_2SSO_3$ wherein M has the same meaning as above in the presence of an organic acid having an ionization constant of about $10^{-5}$, and selected from the group consisting of acetic, benzoic, butyric, crotonic, hexahydrobenzoic and propionic acids, the reaction being carried out in water at a pH value that is maintained between about 6.0 to about 9.0 at all times during the reaction, the amount of water being present at all times being from about 40% to 80% by weight of the total charge.

2. The process of claim 1 in which R, $R^1$, $R^2$, $R^3$ are each hydrogen, M is sodium, and the organic acid is acetic acid.

3. The process of claim 1 in which the reaction is carried out at a temperature range from 20° to 40° C.

4. The process of claim 1 in which the R, $R^1$, $R^2$, and $R^3$ are each hydrogen, M is potassium, and the organic acid is acetic acid.

5. A process for the preparation of alkali metal salts of organic bis-thiosulfates corresponding to the formula:

$$MO_3SSCH-CHSO_2CH-CHSSO_3M$$
$$\phantom{MO_3SS}|\phantom{CH-}|\phantom{CHSO_2}|\phantom{CH-}|$$
$$\phantom{MO_3SSC}R\phantom{H-C}R^1\phantom{HSO_2C}R^1\phantom{H-C}R$$

wherein M is a metal selected from the group consisting of sodium and potassium, R and $R^1$ are each members selected from the group consisting of hydrogen and lower alkyl groups having 1 to 4 carbon atoms, comprising reacting in substantially stoichiometric proportions at temperatures ranging between 10° C. and 80° C. a sulfone of the symmetrical structure:

$$CH=C-SO_2C=CH$$
$$\phantom{CH}|\phantom{=}|\phantom{-SO_2}|\phantom{C}|$$
$$\phantom{CH=}R\phantom{-C}R^1\phantom{-SO_2}R^1\phantom{C=}R$$

wherein R and $R^1$ have the same meaning as above with an alkali metal thiosulfate of the structure $M_2SSO_3$ wherein M has the same meaning as above in the presence of an organic acid having an ionization constant of about $10^{-5}$, and selected from the group consisting of acetic, benzoic, butyric, crotonic, hexahydrobenzoic and propionic acids, the reaction being carried out in water at a pH value that is maintained between about 6.0 to about 9.0 at all times during the reaction, the amount of water being present at all times being from about 40% to 80% by weight of the total charge.

References Cited in the file of this patent

Stahmann et al.: Jour. Org. Chem., 11, pages 719–735 (1946).

Ross: Chem. Soc. Jour. (London), Part III, pages 2257–2272 (1950).